US011892275B2

(12) United States Patent
Silver

(10) Patent No.: US 11,892,275 B2
(45) Date of Patent: Feb. 6, 2024

(54) DRIVE MECHANISM FOR CONTROL SURFACE ACTUATION

(71) Applicant: Raytheon Company, Waltham, MA (US)

(72) Inventor: Stephen Craig Silver, Huntsville, AL (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/824,475

(22) Filed: May 25, 2022

(65) Prior Publication Data

US 2023/0384069 A1 Nov. 30, 2023

(51) Int. Cl.
*B64C 3/38* (2006.01)
*F42B 10/64* (2006.01)
*B63G 8/18* (2006.01)

(52) U.S. Cl.
CPC ............... *F42B 10/64* (2013.01); *B63G 8/18* (2013.01)

(58) Field of Classification Search
CPC .... B63G 8/18; B64C 9/00; B64C 9/02; B64C 9/08; B64C 2009/005; B64C 5/16; B64C 3/38; B64C 3/385; B64C 3/42
See application file for complete search history.

(56) References Cited

U.S. PATENT DOCUMENTS

| 5,333,570 A * | 8/1994 | DuBois | ..................... B63G 8/18 114/144 R |
| 2010/0237199 A1 * | 9/2010 | Jackson | ................. A63H 27/02 244/99.3 |
| 2011/0073705 A1 * | 3/2011 | Huguenin | ............... F42B 10/64 244/3.24 |
| 2012/0211598 A1 * | 8/2012 | Lutke | ........................ B64C 1/34 244/75.1 |
| 2014/0061380 A1 | 3/2014 | Zhao | |
| 2017/0129589 A1 * | 5/2017 | Gomolko | ................ B64C 13/30 |
| 2019/0329862 A1 * | 10/2019 | Theurich | ................. B64C 13/02 |
| 2020/0062383 A1 * | 2/2020 | Kim | ........................ B64U 70/80 |
| 2021/0047022 A1 * | 2/2021 | Robertson | ........... B64C 29/0025 |

FOREIGN PATENT DOCUMENTS

| KR | 20180073232 A | * | 7/2018 |
| KR | 20180076801 A | * | 7/2018 |
| KR | 20220036639 A | * | 3/2022 |

OTHER PUBLICATIONS

International Search Report and Written Opinion issued for related International Application No. PCT/US2023/015730, dated Jun. 28, 2023.

* cited by examiner

*Primary Examiner* — Richard G Davis
(74) *Attorney, Agent, or Firm* — Renner, Otto, Boisselle & Sklar LLP

(57) ABSTRACT

A drive mechanism for actuating a control surface of a vehicle that moves through a fluid medium. The mechanism directly translates the rotational motion provided by an input drive to a control surface that is used to direct the vehicle. The mechanism provides both weight and space savings as well as limits, if not eliminates, backlash. The angled drive mechanism may be particularly suited for use in applications such as UAV/UUV, munitions, and other relatively small platforms.

20 Claims, 5 Drawing Sheets

DRIVE MECHANISM FOR CONTROL SURFACE ACTUATION

FIELD OF THE INVENTION

The present disclosure relates generally to control actuator systems (CAS) for control surfaces for both air and water vehicles.

BACKGROUND

Vehicles moving through a fluid may include control surfaces for adjusting and controlling the path the vehicle takes through the fluid. Such vehicles include aircraft and munitions moving through the air and submersible vehicles moving through the water. Altering the angle of the control surfaces relative to the fluid changes the flow of fluid over the vehicle, and thus the vector of forces acting on the vehicle. The path of the vehicle is thus changed as a result. Likewise, when the control surface is in a neutral position, where the control surface is positioned parallel to the direction of travel, the vehicle's course remains unaltered. By carefully controlling these surfaces, the vehicle's path through the fluid can be precisely controlled.

SUMMARY OF THE INVENTION

The control surfaces for vehicles moving through a fluid require mechanisms for adjusting their position to control the path of the vehicle as it travels. A variety of mechanisms are known to the art, such as pivoting motor screws, for moving control surfaces. However, these mechanisms have several drawbacks. The mechanisms must have sufficient space in which to operate in order to allow the associated control surface the full range of motion needed to steer the vehicle. Additionally, the weight of the mechanisms must be supported by the vehicle. Both the occupied space and weight of the mechanism reduce the amount of fuel and payload the vehicle may carry. Furthermore, known mechanisms are often complex, resulting in multiple points of possible failure. Complex mechanisms are also often prone to backlash, or a delay between an input motion of the drive and the resulting motion of the control surface. Therefore, there is a need for a simplified mechanism for actuating the control surface of vehicles moving through a fluid.

According to an aspect of the disclosure, a drive mechanism includes an input drive that receives rotational input about a drive axis, an input hole provided in the input drive, a control surface, a control surface shaft extending from the control surface, and a control arm extending from the input drive hole, wherein rotation of the input drive about the drive axis is transmitted through the control arm to rotate the control surface shaft about a control surface shaft axis.

According to an embodiment of any paragraph(s) of this summary, a motor provides rotational motion about the drive axis.

According to an embodiment of any paragraph(s) of this summary, the drive axis and the control surface shaft axis are coplanar.

According to an embodiment of any paragraph(s) of this summary, drive axis and the control surface shaft axis are substantially perpendicular.

According to an embodiment of any paragraph(s) of this summary, the second control surface is selected from a fin, a rudder, an aileron, an elevator, a spoiler, a flap, a canard, and a slat.

According to an embodiment of any paragraph(s) of this summary, the control arm is connected to the control shaft via a yoke that engages diametrically opposed sides of the control surface shaft.

According to an embodiment of any paragraph(s) of this summary, the motor provides 360° of motion about the drive axis.

According to an embodiment of any paragraph(s) of this summary, the motor provides 180° of motion about the drive axis.

According to an embodiment of any paragraph(s) of this summary, the input drive hole is at an angle of 0° to 45° relative to the drive axis.

According to an embodiment of any paragraph(s) of this summary, the input drive hole is at an angle of 40° to 50° of the drive axis.

According to an embodiment of any paragraph(s) of this summary, the input drive hole is at an angle of 30° to 50° relative to the drive axis.

According to an embodiment of any paragraph(s) of this summary, the input drive hole is at an angle of 45° relative to the drive axis.

According to an embodiment of any paragraph(s) of this summary, the drive mechanism further comprises a second control surface extending from the control surface shaft at an opposite end from the control surface.

According to an embodiment of any paragraph(s) of this summary, the control surface and the control surface shaft are parts of a unitary, continuous piece.

According to an embodiment of any paragraph(s) of this summary, the control arm pivots around a pivot axis through the control surface shaft.

According to an embodiment of any paragraph(s) of this summary, the pivot axis and the drive central axis are substantially co-planar.

According to an embodiment of any paragraph(s) of this summary, the input drive includes a disk with the angled hole in it, with the disk centered around and rotatable around the drive central axis.

According to an embodiment of any paragraph(s) of this summary, the drive mechanism further comprises a second control surface; a second control surface shaft extending from the second control surface, and a mechanical linkage connecting the second control surface shaft to the control surface shaft such that the rotation of the coupling identically rotates the control surface shaft with the second control surface shaft.

According to an embodiment, a vehicle that includes the drive mechanism of any paragraph(s) of this summary.

According to an embodiment, the vehicle is a flight vehicle, such as a missile or an unmanned aerial vehicle (UAV).

According to an embodiment, the vehicle is an underwater vehicle, such as a torpedo of an unmanned underwater vehicle (UUV).

According to another aspect, a method of actuating a control surface include: providing rotational movement about a drive axis from a motor; rotating an input drive about the drive axis with the rotational movement provided by the motor; and transmitting the rotational motion of the input drive via a control arm to a control surface shaft extending from a control surface so that the control surface shaft rotates about a control surface shaft axis; wherein the control surface shaft axis is substantially perpendicular to the drive axis.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

DETAILED DESCRIPTION

Figure 1:
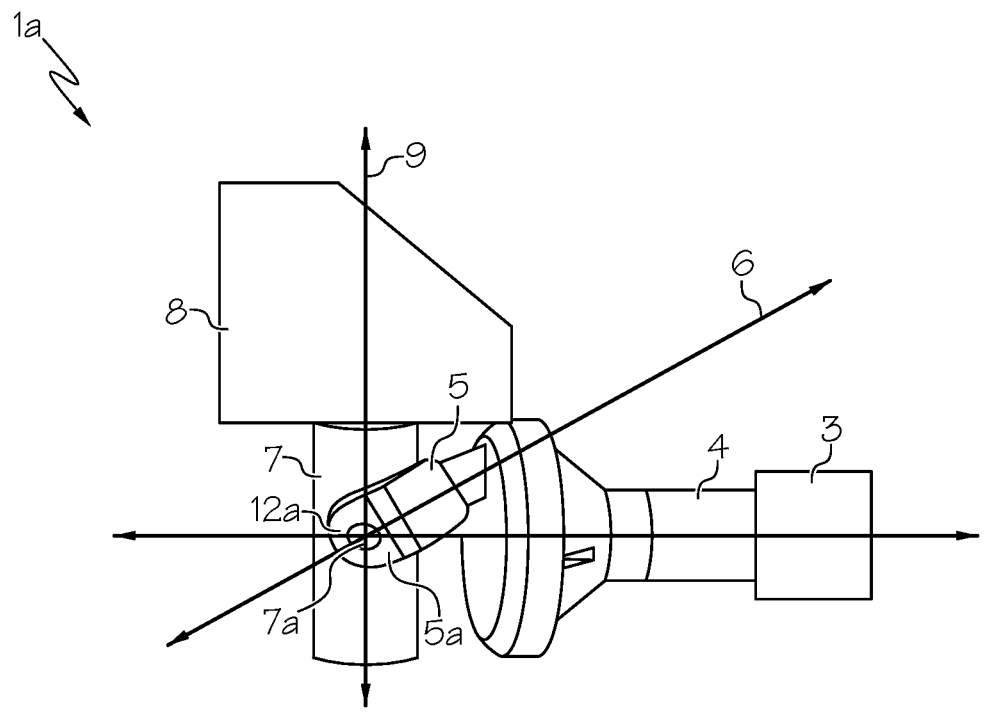
FIG. 1 is a side view of an embodiment according to one aspect of the disclosure.
Figure 2:
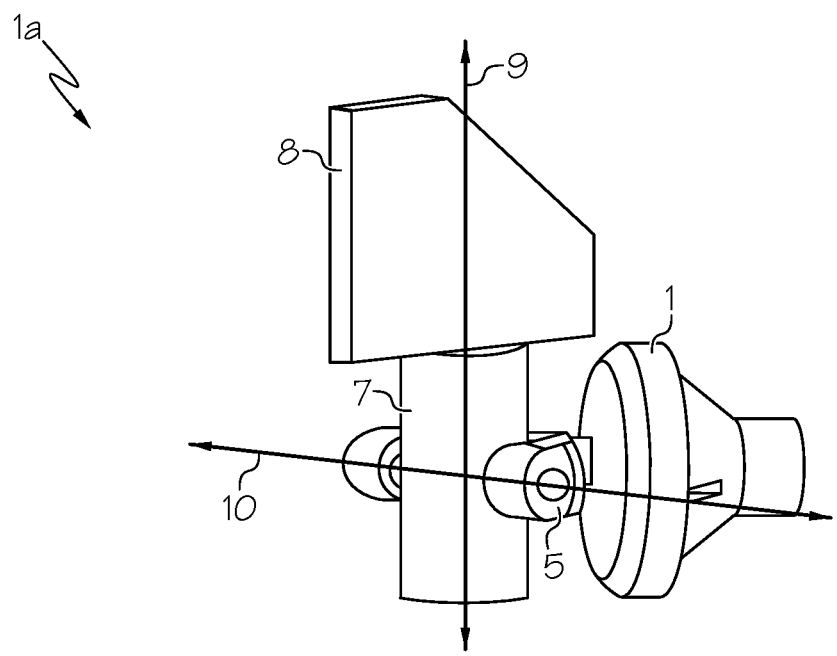
FIG. 2 is a side view of the embodiment of FIG. 1 where the control surface is at maximum left deflection.
Figure 3:
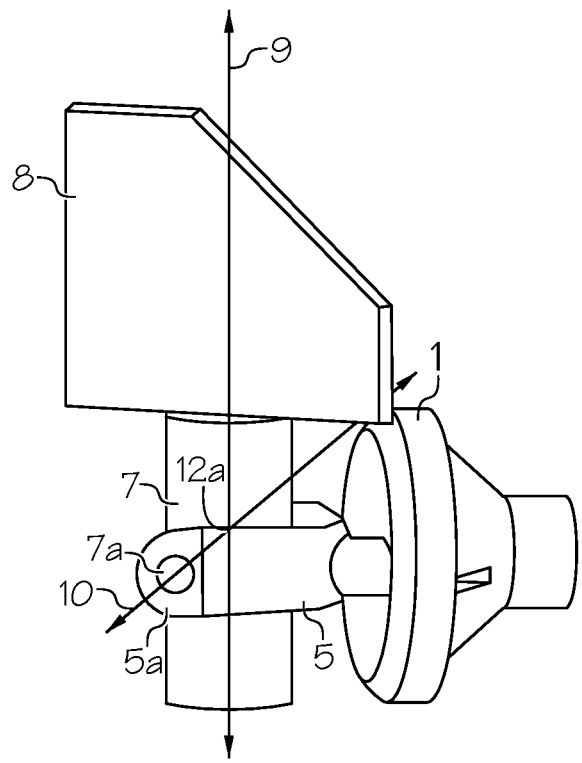
FIG. 3 is a side view of the embodiment of FIGS. 1 and 2 where the control surface is at maximum right deflection.

In one embodiment, the mechanism for actuating the control surface is a drive mechanism 1a as shown in FIGS. 1-3. The drive mechanism 1a may include an input drive 1 that is configured to receive rotational motion about a drive axis 2. The motion may be in a single direction, either clockwise or counterclockwise, or may be in both the clockwise and counterclockwise directions. Additionally, the motion may be 360° of rotation or may be limited to 180° of rotation.

Figure 5:
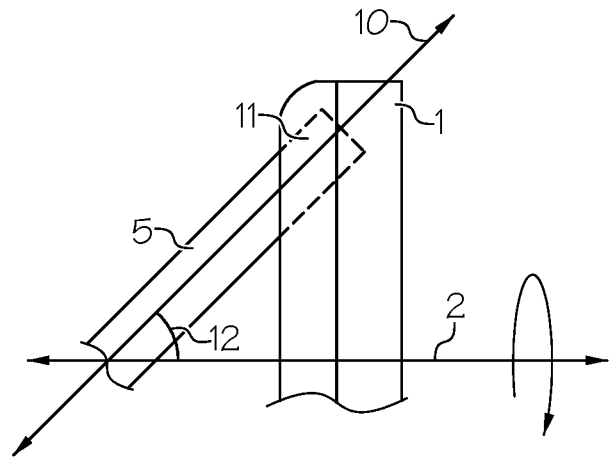
FIG. 5 is a simplified view of the input drive, control arm, and input drive hole.

The input drive 1 may be driven by a motor 3. A gearbox 4 may be interposed between the input drive 1 and motor 3 to modify the output of the motor 3. The input drive 1 may further have an input drive hole 11 (shown in FIG. 5), from which a control arm 5 extends. The control arm 5 is free to rotate within the input drive hole 11 (FIG. 5). A lubricant may be employed in the input drive hole 11 to facilitate the rotation of the input drive hole about a control arm axis 6. Alternatively, mechanical connections may be used to facilitate such rotation, such as a bearing or a bushing.

An end of the control arm 5 opposite of the input drive hole 11 may be connected to a control surface shaft 7 as shown in FIGS. 1-3. The connection between the control arm 5 and the control surface shaft allows the control arm 5 to rotate about a pivot axis 10 that is perpendicular to the control surface shaft axis 8. In one embodiment, the connection between the control arm 5 and the control surface shaft 7 may take the form of a yoke 5a as depicted in FIGS. 1-3. The yoke 5a attaches to the control surface shaft 7 at diametrically opposed sides of the control surface shaft 7. A pin 7a that extends through the control surface shaft 7 provides a pivot connection between the control arm 5 (in particular the yoke 5a) and the control surface shaft 7.

Figure 4:
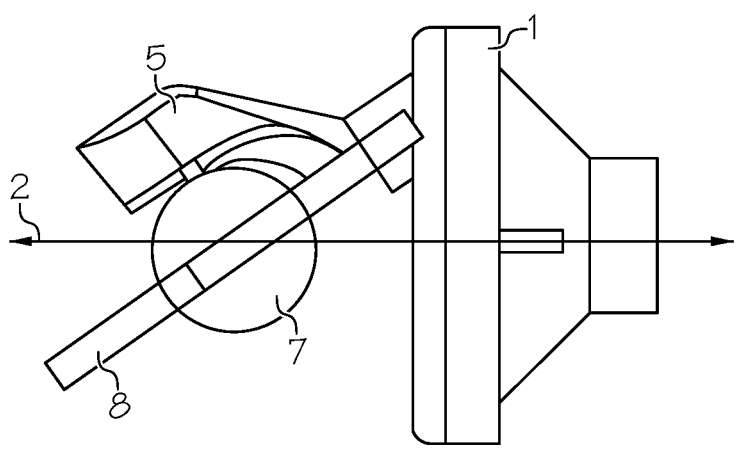
FIG. 4 is a top of another embodiment according to one aspect of the disclosure.

Alternatively, a control arm 5 with a single connection point with the control surface shaft 7 may be used as shown in FIG. 4. Other connections may be utilized so long as the connection allows the control arm 5 to pivot at the first end about the pivot axis 10 that is perpendicular to the shaft axis 9, and allows the control arm 5 the freedom to rotate within the input drive hole 11.

The control surface shaft 7 extends from a control surface 8. The embodiment shown in FIGS. 1-3 depicts a fin as the control surface 8. However, other control surfaces are envisioned. The control surfaces may include a rudder, an aileron, an elevator, a spoiler, a flap, a canard, a slat, a jet vane, or other such surfaces. The control surface shaft 7 may rotate about a control surface shaft axis 9 that is substantially perpendicular to the drive axis 2.

The input drive 1 may have a disk shape, with the angled hole 11 near a periphery of the disk. Alternative the input drive 1 may have any of a variety of other suitable shapes.

Parts such as the input drive 1 and the control arm 5 may be made of any of a variety of suitable materials. Examples include metal materials such as aluminum, steel, and titanium, as well as nonmetallic composite materials.

The control surface shaft 7 and the control surface 8 may be parts of a single, unitary, continuous piece of material. The control surface shaft 7 and the control surface 8 may be made of any of a variety of suitable materials, for example aluminum, steel, or suitable composite materials.

The drive axis 2 and the control surface axis 9 may intersect and be coplanar. In some embodiments the drive axis 2 and the control surface axis may be substantially perpendicular (or perpendicular).

The pivot axis 10 and the control surface axis 9 also may intersect and be coplanar. As noted above, the pivot axis 10 and the control surface axis 9 may be substantially perpendicular (or perpendicular).

More generally, the drive axis 2, the control arm axis 6, the control surface axis 9, and the pivot axis 10, may all interest at a common point 12a. Any pair of the axes 2, 6, 9, and 10 may be coplanar.

In operation, the input drive 1 receives rotational movement from the motor 3. When in the neutral position the control surface 8 and control arm 5 are substantially in the plane formed by the drive axis 2 and control surface shaft axis 9 as shown in FIG. 1. As the input drive 1 rotates about the drive axis 2 the control arm 5 is moved out of the plane formed by the drive axis 2 and the shaft axis 9. The control arm 5 transmits this motion to the control surface shaft 7 so that the control surface shaft 7 rotates about the control surface shaft axis 9, which further transfers the motion to the control surface 8. As a result, the control surface 8 reaches a maximum deflection in a first direction when the input drive 1 has been rotated 90° counterclockwise as shown in FIG. 2 and a maximum deflection in the opposite direction when the input drive 1 has been rotated 90° clockwise as shown in FIG. 3.

The maximum angle achieved by the control surface 8 is determined by the angle 12 of the input drive hole 11 as measured relative to the drive axis 2 as shown in FIG. 5. The angle 12 may be from 30° to 60°. Preferably, the angle 12 may be 30° (or) 40° to 50°. More preferably, the angle 12 may be 45° or about 45°. Alternatively the angle 12 may be greater than 0° (or 5° or 10°) up to 45°. The angle 12 may be selected to fit the particular application in which the drive mechanism will be used, taking into account vehicle type, expected flight conditions, and other factors.

Figure 6:
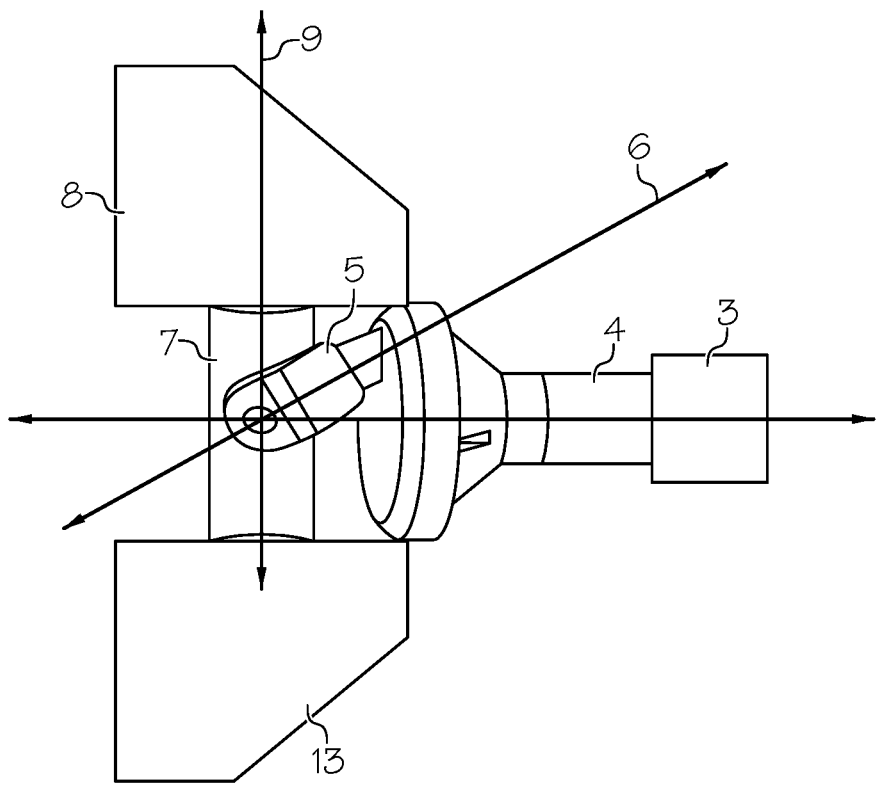
FIG. 6 is a side view of another embodiment according to one aspect of the disclosure.

The drive mechanism 1a may be used to control additional control surfaces as well. In one embodiment, a second control surface 13 may extend from the control surface shaft 7 at an opposite end from the control surface 8 as shown in FIG. 6. In yet another embodiment, input drive and coupling may be connected with a plurality of control surfaces.

Figure 7:
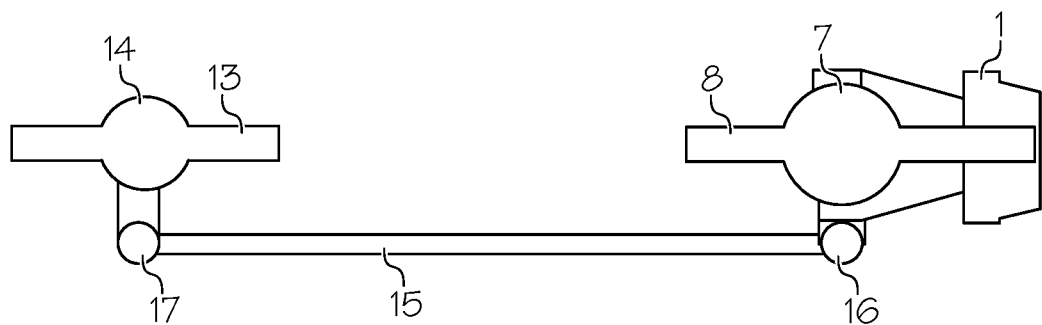
FIG. 7 is a top view of another embodiment according to one aspect of the disclosure.
Figure 8:
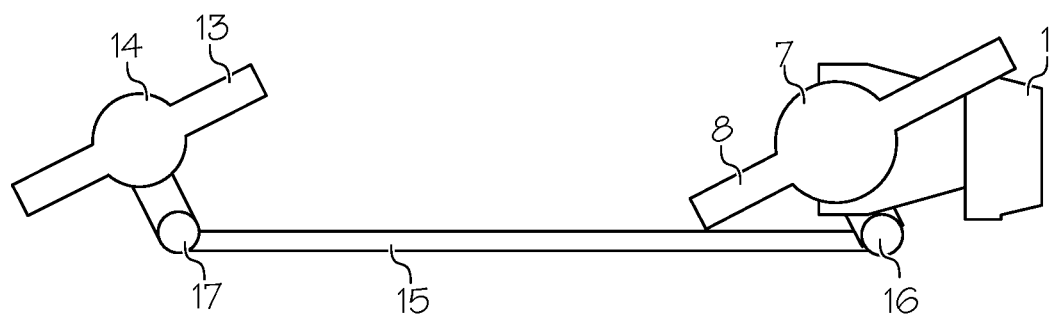
FIG. 8 is a top view of the embodiment of FIG. 7 where the control surface and second control surface are at maximum left deflection.

FIGS. 7 and 8 depict an embodiment with a second control surface 13 controlled by the same input drive 1 as the control surface 8. A second control surface shaft 14 may extend from the second control surface 13. The motion of the input drive 1 may be transferred to the first control surface 8 in the same manner as in the first embodiment. A mechanical linkage 15 may be further included to transfer the motion to the second control surface shaft 14. The mechanical linkage 15 may include linkage pivot points 16, 17. As seen in FIG. 8, the motion of the first control surface 8 is mirrored by the second control surface 13 due to the connection via the mechanical linkage 15. It will be appreciated that a plurality of control surfaces may be so connected with the common input drive 1 by incorporating the appropriate mechanical linkage to each respective control surface shaft.

It will be appreciated that the drive mechanism provides simplified actuation of the control surface by directly translating the rotational motion of the input drive. Complicated linkages are rendered unnecessary, providing savings in terms of both weight and space. Additionally, the drive mechanism of each of the embodiments may exhibit little to no backlash. In other words, the delay between the time the motion is input by the input drive and ultimately realized by the control surface may be minimized. Furthermore, the drive mechanism described in the embodiments may be particularly suited to applications where the forces acting on the control surface are expected to be relatively small.

Figure 9:
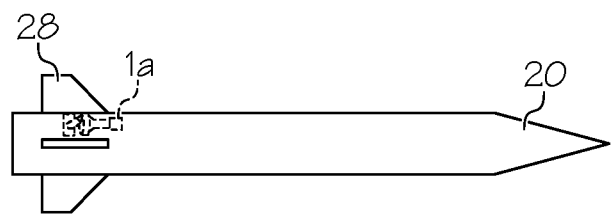
FIG. 9 is a schematic view of a drive mechanism as part of a flight vehicle, according to an embodiment.

FIG. 9 shows a flight vehicle 20 that includes the drive mechanism (or angled drive) 1a described in any of the above embodiments, for positioning a control surface 28. The flight vehicle may be a missile or an unmanned aerial vehicle (UAV), to give non-limiting examples.

Figure 10:
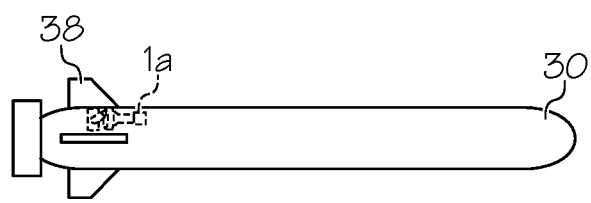
FIG. 10 is a schematic view of a drive mechanism as part of a water vehicle, such as an underwater vehicle, according to an embodiment.
Figure 11:
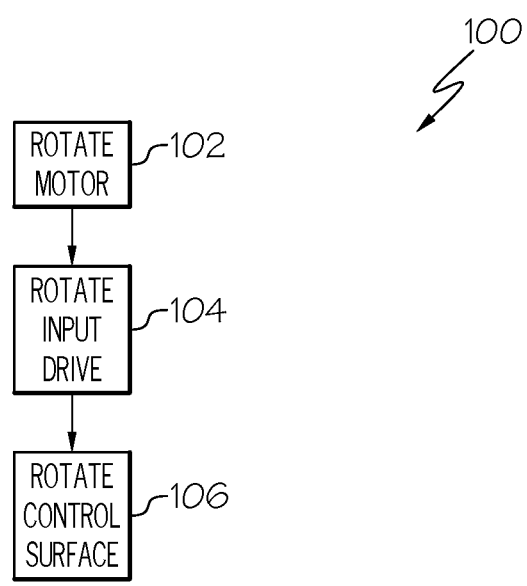
FIG. 11 is a flow chart of the basic operation of the drive mechanism, according to the disclosure.

FIG. 10 shows a water vehicle 30, such as an underwater vehicle, that includes the drive mechanism (or angled drive) 1a as described in any of the above embodiments, for positioning a control surface 38. The flight vehicle may be a torpedo or an unmanned underwater vehicle (UUV), to give non-limiting examples FIG. 11 shows a high-level flow chart of a method 100 of actuating (moving) a control surface using a drive mechanism, such as the drive mechanism 1a (FIG. 1). In step 102 a motor, such as the motor 3 (FIG. 1), provides rotational movement about the drive axis 2 (FIG. 1). In step 104 the rotational movement provided by the motor 3 is used to rotate the input drive 1 (FIG. 1) about the drive axis 2. In step 106 the rotational motion of the input drive 1 is transmitted via the control arm 5 (FIG. 1) to the control surface shaft 7 (FIG. 1) extending from the control surface 8 (FIG. 1) so that the control surface shaft 7 rotates about the control surface shaft axis 9 (FIG. 1). The control surface shaft axis 9 may be substantially perpendicular to the drive axis 2.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A drive mechanism, comprising:
    an input drive that receives rotational input about a drive axis;
    an input drive hole provided in the input drive;
    a control surface;
    a control surface shaft extending from the control surface; and
    a control arm extending from the input drive hole;
    wherein rotation of the input drive about the drive axis is transmitted through the control arm to rotate the control surface shaft about a control surface shaft axis; and
    wherein the control arm is directly mechanically coupled to the control surface shaft.

2. The drive mechanism of claim 1, wherein the drive axis and the control surface shaft axis are coplanar.

3. The drive mechanism of claim 1, wherein the drive axis and the control surface shaft axis are substantially perpendicular.

4. The drive mechanism of claim 1,
    wherein the input drive includes a disk with the angled hole therein; and
    wherein the disk is centered around and rotatable around the drive central axis.

5. The drive mechanism of claim 1, wherein the control arm is connected to the control surface shaft via a yoke that engages diametrically opposed sides of the control surface shaft.

6. The drive mechanism of claim 1, wherein the control arm engages a pin that passed through the control surface shaft.

7. The drive mechanism of claim 1, wherein the control surface is selected from a fin, a rudder, an aileron, an elevator, a spoiler, a flap, a canard, and a slat.

8. The drive mechanism of claim 1, further comprising a motor that provides rotational motion about the drive axis.

9. The drive mechanism of claim 8, wherein the motor provides 360° of motion about the drive axis.

10. The drive mechanism of claim 8, wherein the motor provides 180° of motion about the drive axis.

11. The drive mechanism of claim 8, further comprising a gearbox interposed between the motor and the coupling.

12. The drive mechanism of claim 1, wherein the input drive hole is at an angle of 30° to 50° relative to the drive axis.

13. The drive mechanism of claim 1, further comprising a second control surface extending from the control surface shaft at an opposite end from the control surface.

14. The drive mechanism of claim 1, further comprising:
    a second control surface;

a second control surface shaft extending from the second control surface; and a mechanical linkage connecting the second control surface shaft to the control surface shaft such that the rotation of the coupling identically rotates the control surface shaft with the second control surface shaft.

15. A drive mechanism, comprising:

an input drive that receives rotational input about a drive axis;

an input drive hole provided in the input drive;

a control surface;

a control surface shaft extending from the control surface; and a control arm extending from the input drive hole;

wherein rotation of the input drive about the drive axis is transmitted through the control arm to rotate the control surface shaft about a control surface shaft axis; and wherein the control arm rotates within the input drive hole about a control arm axis as the input drive rotates about the drive axis.

16. A drive mechanism, comprising:

an input drive that receives rotational input about a drive axis;

an input drive hole provided in the input drive;

a control surface;

a control surface shaft extending from the control surface; and a control arm extending from the input drive hole;

wherein rotation of the input drive about the drive axis is transmitted through the control arm to rotate the control surface shaft about a control surface shaft axis;

wherein the control arm pivots around a pivot axis through the control surface shaft; and wherein the pivot axis and the drive central axis are substantially co-planar.

17. A vehicle that includes the drive mechanism of claim 1.

18. The vehicle of claim 17, wherein the vehicle is a flight vehicle.

19. The vehicle of claim 17, wherein the vehicle is an underwater vehicle.

20. A method of actuating a control surface, comprising:

providing rotational movement from a motor, about a drive axis;

rotating an input drive about the drive axis with the rotational movement provided by the motor; and transmitting the rotational motion of the input drive via a control arm to a control surface shaft extending from the control surface so that the control surface shaft rotates about a control surface shaft axis;

wherein the control surface shaft axis is substantially perpendicular to the drive axis; and wherein the control arm is directly mechanically coupled to the control surface shaft.

* * * * *

UNITED STATES PATENT AND TRADEMARK OFFICE
CERTIFICATE OF CORRECTION

| | |
|---|---|
| PATENT NO. | : 11,892,275 B2 |
| APPLICATION NO. | : 17/824475 |
| DATED | : February 6, 2024 |
| INVENTOR(S) | : Stephen Craig Silver |

Page 1 of 1

It is certified that error appears in the above-identified patent and that said Letters Patent is hereby corrected as shown below:

In the Specification

In Column 3, Line 67, delete "8." and insert --9.-- therefor

In Column 4, Line 67, delete "(or) 40°" and insert --(or 40°)-- therefor

In Column 5, Line 49, delete "examples" and insert --examples.-- therefor

Signed and Sealed this
Seventeenth Day of December, 2024

Derrick Brent
*Acting Director of the United States Patent and Trademark Office*